(12) United States Patent
Tsuruta (10) Patent No.: US 11,465,607 B2
(45) Date of Patent: Oct. 11, 2022

(54) HYBRID VEHICLE

(71) Applicant: TOYOTA JIDOSHA KABUSHIKI KAISHA, Toyota (JP)

(72) Inventor: Yoshiaki Tsuruta, Nagakute (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 126 days.

(21) Appl. No.: 17/156,700

(22) Filed: Jan. 25, 2021

(65) Prior Publication Data

US 2021/0331660 A1 Oct. 28, 2021

(30) Foreign Application Priority Data

Apr. 22, 2020 (JP) .............................. JP2020-076021

(51) Int. Cl.
| | | |
|---|---|---|
| *B60W 20/13* | (2016.01) | |
| *B60W 10/06* | (2006.01) | |
| *B60W 20/15* | (2016.01) | |
| *B60W 10/08* | (2006.01) | |
| *F02D 9/02* | (2006.01) | |

(52) U.S. Cl.
CPC ............ *B60W 20/13* (2016.01); *B60W 10/06* (2013.01); *B60W 10/08* (2013.01); *B60W 20/15* (2016.01); *F02D 2009/0213* (2013.01)

(58) Field of Classification Search
CPC ...... B60W 20/13; B60W 10/06; B60W 10/08; B60W 2510/244; F02D 31/003
See application file for complete search history.

(56) References Cited

U.S. PATENT DOCUMENTS

| | | | | |
|---|---|---|---|---|
| 2002/0163199 | A1* | 11/2002 | Ramaswamy ........ | F02D 31/008 290/40 C |
| 2007/0235006 | A1* | 10/2007 | Nishigaki .............. | B60K 6/445 123/339.1 |
| 2009/0319109 | A1* | 12/2009 | Ando ..................... | B60K 6/365 903/930 |
| 2013/0297119 | A1* | 11/2013 | Reed ..................... | B60W 20/00 180/65.265 |

(Continued)

FOREIGN PATENT DOCUMENTS

| | | |
|---|---|---|
| JP | 2010-264817 A | 11/2010 |
| JP | 2013-154699 A | 8/2013 |

(Continued)

*Primary Examiner* — Lindsay M Low
*Assistant Examiner* — Arnold Castro
(74) *Attorney, Agent, or Firm* — Oliff PLC (57) ABSTRACT

A vehicle includes an engine, a second MG for running, a battery that supplies and receives electric power to and from the second MG, and an ECU. The ECU is configured to control the engine and the second MG and to execute intake air amount learning. When the SOC of the battery exceeds a second threshold value that is higher than a first threshold value while the vehicle is running using the second MG with the engine in a stopped state, the ECU maintains the engine in the stopped state and maintains the second MG in a driven state, and then does not execute the intake air amount learning. When the SOC of the battery takes a value between the first threshold value and the second threshold value, the ECU starts the engine, drives the second MG with constant torque, and executes the intake air amount learning.

8 Claims, 8 Drawing Sheets

(56) References Cited

U.S. PATENT DOCUMENTS

| | | | |
|---|---|---|---|
| 2015/0176511 A1* | 6/2015 | Ando | F02D 41/1402 60/285 |
| 2015/0274166 A1* | 10/2015 | Hirai | B60W 10/02 701/67 |
| 2021/0114580 A1* | 4/2021 | Hashimoto | B60W 50/045 |
| 2021/0189991 A1* | 6/2021 | Hashimoto | G06Q 30/0224 |
| 2021/0254571 A1* | 8/2021 | Hashimoto | G06N 3/006 |

FOREIGN PATENT DOCUMENTS

| | | |
|---|---|---|
| JP | 2015-112992 A | 6/2015 |
| WO | 2015/087120 A1 | 6/2015 |

* cited by examiner

HYBRID VEHICLE

CROSS-REFERENCE TO RELATED APPLICATION

This application claims priority to Japanese Patent Application No. 2020-076021 filed on Apr. 22, 2020, incorporated herein by reference in its entirety.

BACKGROUND

1. Technical Field

The present disclosure relates to a hybrid vehicle, and more specifically, to learning of an intake air amount of an engine included in the hybrid vehicle.

2. Description of Related Art

In recent years, hybrid vehicles have become widespread. The hybrid vehicle includes an engine and a motor as drive sources. In the engine, feedback control is executed to operate the engine in an appropriate state. In the feedback control, an intake air amount required to maintain an idling rotation speed of the engine to be constant may change due to factors such as individual differences and changes with time of the engine. Therefore, so-called learning control in which the result of feedback is reflected and stored is executed.

For example, Japanese Unexamined Patent Application Publication No. 2010-264817 (JP 2010-264817 A) discloses a control device for a hybrid vehicle. The control device above learns the intake air amount while a clutch is released and the engine is operating while the vehicle is running using the motor. This makes it possible to increase an opportunity to learn the intake air amount.

SUMMARY

In general, learning of the intake air amount is executed while the vehicle is stopped and the engine is idling with no load. Therefore, there are few opportunities to learn the intake air amount. The control device for the hybrid vehicle disclosed in JP 2010-264817 A can increase learning opportunities by learning the intake air amount while the vehicle is running using the motor (motor running). On the other hand, JP 2010-264817 A does not consider battery protection. It is desirable to achieve both increased opportunities to learn the intake air amount and the battery protection.

The present disclosure has been made to solve the issue as described above, and an object of the present disclosure is to achieve both an increase in the opportunities to learn the intake air amount and the battery protection in the hybrid vehicle.

(1) A hybrid vehicle according to an aspect of the present disclosure includes an engine, a motor for running, a battery that supplies and receives electric power to and from the motor, and a control device. The control device is configured to control the engine and the motor and to execute intake air amount learning to learn the intake air amount of the engine. A first threshold value and a second threshold value that is higher than the first threshold value are defined for a state of charge of the battery. While the hybrid vehicle is running using the motor with the engine in a stopped state, the control device does not execute the intake air amount learning with maintaining the motor in a driven state while the engine is maintained in the stopped state when the state of charge of the battery exceeds the second threshold value. The control unit executes the intake air amount learning with the engine started and the motor driven with constant torque when the state of charge of the battery takes a value between the first threshold value and the second threshold value.

(2) The control device starts the engine and prohibits driving of the motor to execute the intake air amount learning when the state of charge of the battery falls below the first threshold value.

(3) The constant torque that is output from the motor when the state of charge of the battery takes a value between the first threshold value and the second threshold value is smaller than torque output from the motor when the state of charge of the battery exceeds the second threshold value.

(4) The first threshold value is higher than a state-of-charge control center of the battery.

In (1) to (4) above, when the state of charge (SOC) of the battery falls below the first threshold value, the engine is started and driving of the motor is prohibited to secure an opportunity to learn the intake air amount. On the other hand, when the SOC of the battery exceeds the second threshold value, the intake air amount learning is not executed and the motor is maintained in a driven state to suppress over-charging of the battery. With the processing above, it is possible to achieve both protection of the battery and securing of the opportunity to execute the intake air amount learning. Further, when the SOC of the battery takes a value between the first threshold value and the second threshold value, the intake air amount learning is executed while driving the motor with a constant torque (preferably low torque). This also secures the opportunity to execute the intake air amount learning while protecting the battery.

(5) A hybrid vehicle according to an aspect of the present disclosure includes an engine, a motor for running, a battery that supplies and receives electric power to and from the motor, and a control device. A control device is configured to control the engine and the motor and to execute intake air amount learning to learn the intake air amount of the engine. A third threshold value and a fourth threshold value that is lower than the third threshold value are defined for a state of charge of the battery. While the motor is being regeneratively driven with the engine in a stopped state, the control device does not execute the intake air amount learning with maintaining the motor in a regenerative state when the state of charge of the battery falls below the fourth threshold value. The control unit starts the engine and regeneratively drives the motor with constant torque to execute the intake air amount learning when the state of charge of the battery takes a value between the third threshold value and the fourth threshold value.

(6) The control device starts the engine and prohibits regeneration of the motor to execute the intake air amount learning when the state of charge of the battery exceeds the third threshold value.

(7) The constant torque with which the motor is regeneratively driven when the state of charge of the battery takes a value between the third threshold value and the fourth threshold value is smaller than torque with which the motor is regeneratively driven when the state of charge of the battery falls below the fourth threshold value.

(8) The third threshold value is higher than a state-of-charge control center of the battery.

In (5) to (8) above, similar to (1) to (4) above, when the SOC of the battery exceeds the third threshold value, the engine is started and regeneration of the motor is prohibited to secure the opportunity to learn the intake air amount. On the other hand, when the SOC of the battery falls below the fourth threshold value, the intake air amount learning is not executed and the motor is maintained in the regenerative state to suppress over-discharging of the battery. With the processing above, it is possible to achieve both protection of the battery and securing of the opportunity to execute the intake air amount learning. Further, when the SOC of the battery takes a value between the third threshold value and the fourth threshold value, the intake air amount learning is executed while regeneratively driving the motor with a constant torque (preferably low torque). This also secures the opportunity to execute the intake air amount learning while protecting the battery.

According to the present disclosure, it is possible to achieve both increased learning opportunities for the intake air amount and battery protection in a hybrid vehicle.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Hereinafter, embodiments of the present disclosure will be described in detail with reference to the drawings. It should be noted that the same or corresponding portions in the drawings are designated by the same reference signs and repetitive description will be omitted.

First Embodiment

Vehicle Configuration

Figure 1:
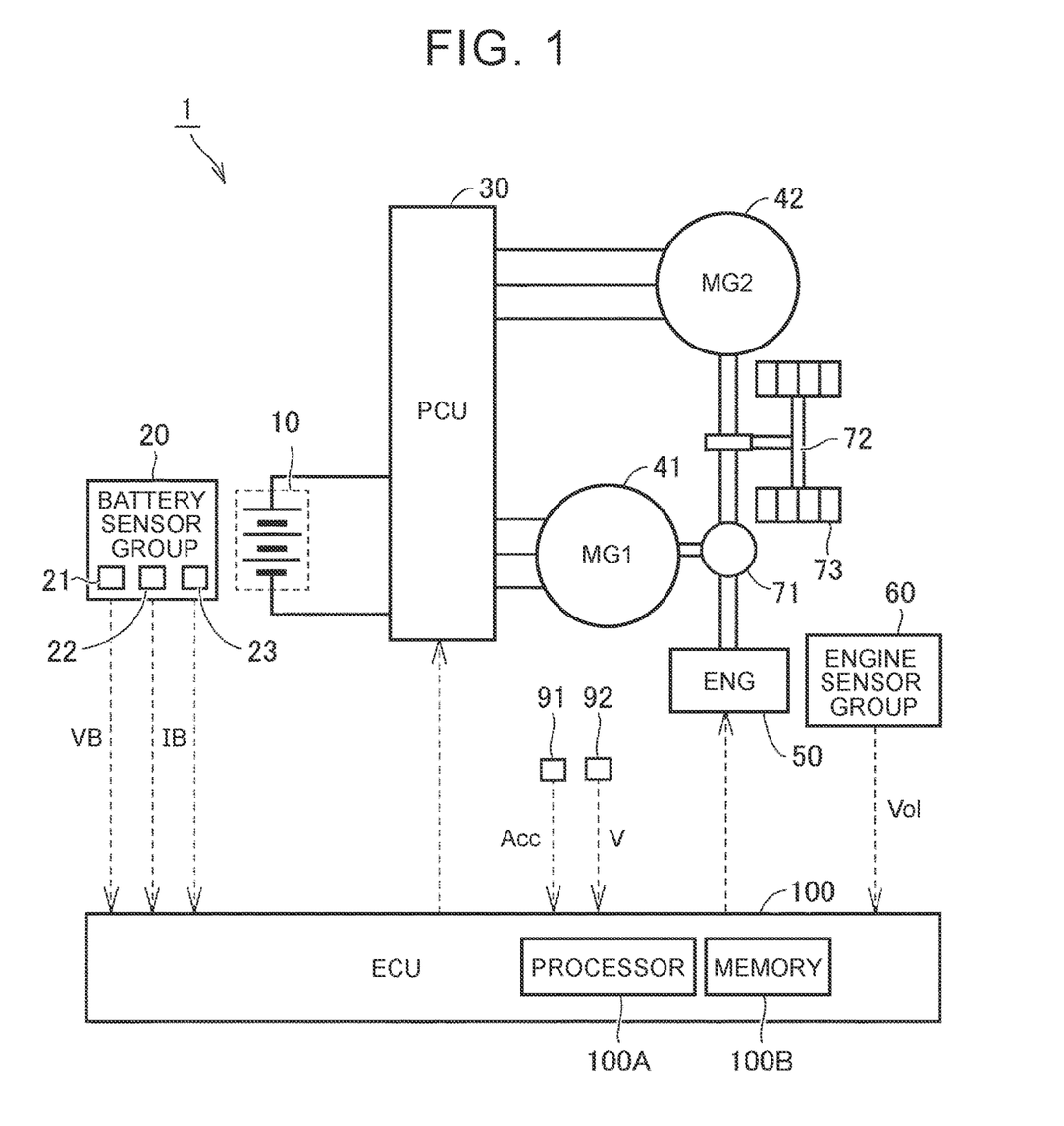
FIG. 1 is a diagram schematically showing an overall configuration of a hybrid vehicle according to the first embodiment.

FIG. 1 is a diagram schematically showing an overall configuration of a hybrid vehicle according to a first embodiment. With reference to FIG. 1, a vehicle 1 is a hybrid vehicle, and includes a battery 10, a battery sensor group 20, a power control unit (PCU) 30, a first motor generator (MG) 41, a second motor generator 42, an engine 50, an engine sensor group 60, a power split device 71, a drive shaft 72, drive wheels 73, an accelerator pedal position sensor 91, a vehicle speed sensor 92, and an electronic control unit (ECU) 100.

The battery 10 is an assembled battery composed of a plurality of cells. Each cell is a secondary battery such as a lithium ion battery or a nickel metal hydride battery. The battery 10 stores electric power for driving the first motor generator 41 and the second motor generator 42, and supplies the electric power to the first motor generator 41 and the second motor generator 42 via the PCU 30. Further, when the first motor generator 41 and the second motor generator 42 generate electric power, the battery 10 receives the generated power via the PCU 30 and is charged with the received power. A capacitor such as an electric double layer capacitor may be used instead of the battery 10.

The battery sensor group 20 monitors a state of the battery 10. More specifically, the battery sensor group 20 includes a voltage sensor 21, a current sensor 22, and a temperature sensor 23. The voltage sensor 21 detects a voltage VB of each cell included in the battery 10. The current sensor 22 detects a current IB charged to and discharged from the battery 10. The temperature sensor 23 detects a temperature TB of the battery 10. Each of the above sensors outputs a signal indicating the detection result to the ECU 100.

The PCU 30 executes bidirectional power conversion between the battery 10 and the first motor generator 41 and the second motor generator 42, or between the first motor generator 41 and the second motor generator 42 in accordance with a control command from the ECU 100. The PCU 30 is configured such that states of the first motor generator 41 and the second motor generator 42 can be controlled separately from each other. More specifically, the PCU 30 includes, for example, two inverters and a converter (both not shown). The inverters are provided corresponding to the first motor generator 41 and the second motor generator 42, respectively. The converter boosts a direct current (DC) voltage supplied to each of the two inverters to reach or exceed an output voltage of the battery 10. Therefore, the PCU 30 can, for example, cause the second motor generator 42 to enter a power running state while causing the first motor generator 41 to enter a regenerative state (power generation state).

Each of the first motor generator 41 and the second motor generator 42 is an alternate current (AC) rotating electric machine, and, for example, a three-phase AC synchronous electric machine having a rotor in which a permanent magnet is embedded. The first motor generator 41 is mainly used as a generator driven by the engine 50 via the power split device 71. The electric power generated by the first motor generator 41 is supplied to the second motor generator 42 or the battery 10 via the PCU 30. The first motor generator 41 can also crank the engine 50.

The second motor generator 42 mainly operates as an electric motor and drives the drive wheels 73. The second motor generator 42 receives at least one of the electric power from the battery 10 and the electric power generated by the first motor generator 41, and is driven by the received electric power. A driving force of the second motor generator 42 is transmitted to the drive shaft (output shaft) 72. Further, when the vehicle 1 is braked or acceleration of the vehicle 1 is reduced on a downward slope, the second motor generator 42 operates as a generator to generate regenerative power generation. The electric power generated by the second motor generator 42 is supplied to the battery 10 via the PCU 30.

The engine 50 converts a combustion energy generated when an air-fuel mixture in which air and fuel are mixed is burned into a kinetic energy of a mover (e.g. piston or rotor) to output power.

The engine sensor group 60 detects a state quantity of the engine 50. The engine sensor group 60 includes a throttle opening sensor 61, an intake air temperature sensor 62, a water temperature sensor 63, an air-fuel ratio sensor 64, an air flow meter 65, a crank position sensor 66, and a knock sensor 67 (see FIG. 2 for all of the above).

The power split device 71 is, for example, a planetary gear device. The power split device 71 includes a sun gear, a ring gear, a pinion gear, and a carrier, which are all not shown. The carrier is connected to the engine 50. The sun gear is connected to the first motor generator 41. The ring gear is connected to the second motor generator 42 and the drive wheels 73 via the drive shaft 72. The pinion gear meshes with the sun gear and the ring gear. The carrier holds the pinion gear so as to rotatable and revolvable.

The accelerator pedal position sensor 91 detects an amount of depression of an accelerator pedal (not shown) by a user as an accelerator operation amount Acc, and outputs the detection result to the ECU 100. The vehicle speed sensor 92 detects a rotational speed of the drive shaft 72 as a vehicle speed V, and outputs the detection result to the ECU 100.

The ECU 100 includes a processor 100A such as a central processing unit (CPU), a memory 100B such as a read only memory (ROM) and a random access memory (RAM), and an input-output port (not shown) for inputting and outputting various signals. The ECU 100 monitors the state of the battery 10 based on the signal received from each sensor of the battery sensor group 20 and a program and a map separately stored in the memory 100B. Further, the ECU 100 controls the PCU 30 and the engine 50 of the vehicle 1 based on a signal received from each sensor of the battery sensor group 20 and the program and the map stored in a memory 100B.

For example, a driving force map (not shown) is prepared in advance in the memory 100B of the ECU 100. The driving force map shows a relationship among a driving force required by the user for the vehicle 1 (hereinafter referred to as "required driving force P*"), the accelerator operation amount Acc, and the vehicle speed V. The ECU 100 can calculate the required driving force P* based on the accelerator operation amount Acc and the vehicle speed V with reference to the driving force map.

Examples of main processing executed by the ECU 100 in the first embodiment include learning of the intake air amount of the engine 50. The learning of the intake air amount means learning of an average difference between "throttle opening—flow rate characteristics" stored in the memory 100B and "current throttle opening detected by the throttle sensor—flow rate characteristics detected by the air flow meter". Hereinafter, the processing above is also referred to as idle speed control (ISC) learning. The ISC learning will be described later. The ECU 100 may be divided into a plurality of ECUs (e.g. battery ECU, engine ECU, and MG ECU) corresponding to the respective functions.

Running of the vehicle 1 using the second motor generator 42 will be hereinafter referred to as "motor running". Further, running of the vehicle 1 using both the second motor generator 42 and the engine 50 will be hereinafter referred to as "hybrid running". The second motor generator 42 corresponds to the "motor" according to the present disclosure. Therefore, the second motor generator 42 may be simply referred to as the "motor". It is not essential that the vehicle 1 is equipped with two motor generators (the first motor generator 41 and the second motor generator 42). The vehicle 1 may have a vehicle configuration in which only one motor generator is provided (so-called one-motor system).

Engine Configuration

Figure 2:
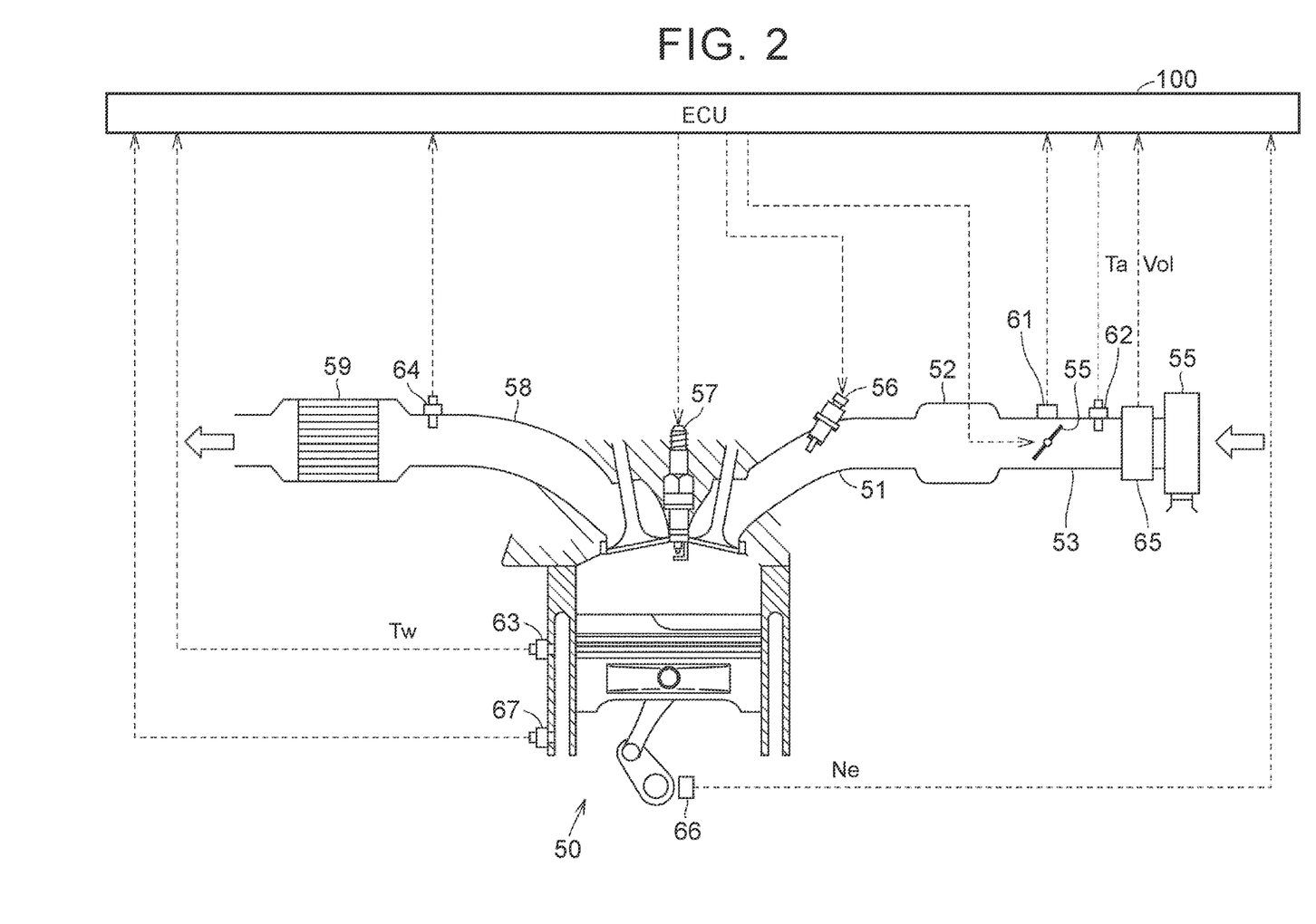
FIG. 2 is a diagram for explaining configurations of an engine and an engine sensor group in more detail.

FIG. 2 is a diagram for explaining configurations of the engine 50 and the engine sensor group 60 in more detail. With reference to FIG. 2, the engine 50 actually includes a plurality of cylinders. However, in order to avoid complication of the drawing, one cylinder is typically shown in FIG. 2.

Each of the plurality of cylinders is connected to a common surge tank 52 via an intake branch pipe 51 corresponding to the cylinder. The surge tank 52 is connected to the air cleaner 54 via an intake duct 53. A throttle valve 55 is disposed in the intake duct 53. The throttle valve 55 is controlled to open and close the intake duct 53 in conjunction with depression of the accelerator pedal (not shown).

Each cylinder is provided with an injector 56 for injecting fuel into an intake port or the intake branch pipe 51. A spark plug 57 is provided at the top of a combustion chamber. The air-fuel mixture of the air taken in from the air cleaner 54 and the fuel injected from the injector 56 is introduced into the combustion chamber when the intake valve is opened. The engine 50 is ignited by the spark plug 57 in the combustion chamber and burns the air-fuel mixture based on a control signal from the ECU 100. When the air-fuel mixture is burned, a combustion pressure pushes down the piston, which rotates a crankshaft. The air-fuel mixture (exhaust gas) after combustion is discharged from the combustion chamber when an exhaust valve is opened. Each cylinder is connected to a common exhaust manifold 58. The exhaust manifold 58 is connected to a three-way catalytic converter 59. The exhaust gas flows through the three-way catalytic converter 59 and then is discharged to the outside of the vehicle. A fuel injection method is not limited to a method of a port injection type, and may be a direct injection type or a dual injector type.

The throttle opening sensor 61 outputs a signal indicating the opening (throttle opening) of the throttle valve 55 to the ECU 100.

The intake air temperature sensor 62 outputs, to the ECU 100, a signal indicating a temperature (intake air temperature) Ta of the air taken in to the engine 50.

The water temperature sensor 63 outputs, to the ECU 100, a signal indicating a temperature (coolant temperature) Tw of a coolant in a water jacket (not shown) of the engine 50.

The air-fuel ratio sensor 64 is attached to the exhaust manifold 58 upstream of the three-way catalytic converter 59. The air-fuel ratio sensor 64 is, for example, an $O_2$ sensor, and outputs a voltage corresponding to an oxygen concentration in an exhaust gas. The output voltage of the air-fuel ratio sensor 64 can be used to detect, in terms of on or off, whether an air-fuel ratio of the air-fuel mixture burned in the engine 50 is rich or lean with respect to a stoichiometric air-fuel ratio.

The air flow meter 65 is provided in an intake duct 53. The air flow meter 65 outputs, to the ECU 100, a signal indicating the intake air amount (hereinafter also referred to as VOL).

The crank position sensor 66 outputs, to the ECU 100, a signal indicating a rotation speed (engine speed) Ne of the crankshaft. The ECU 100 detects a crank angle and the rotation speed of the crankshaft based on a signal from the crank position sensor 66.

The knock sensor 67 is provided in a cylinder block of the engine 50. The knock sensor 67 is composed of a piezo-electric element, and outputs, to the ECU 100, a voltage corresponding to the magnitude of vibration of the engine 50. The ECU 100 controls an ignition timing for each operating state of the engine 50 based on the voltage from the knock sensor 67. In ignition timing control, the ignition timing is gradually advanced while knocking is not detected, and the ignition timing is adjusted to the retard side when knocking occurs. With the control above, occurrence of knocking can be suppressed, and the output and fuel consumption of the engine 50 can be appropriately controlled.

Engine Operating Condition

Figure 3:
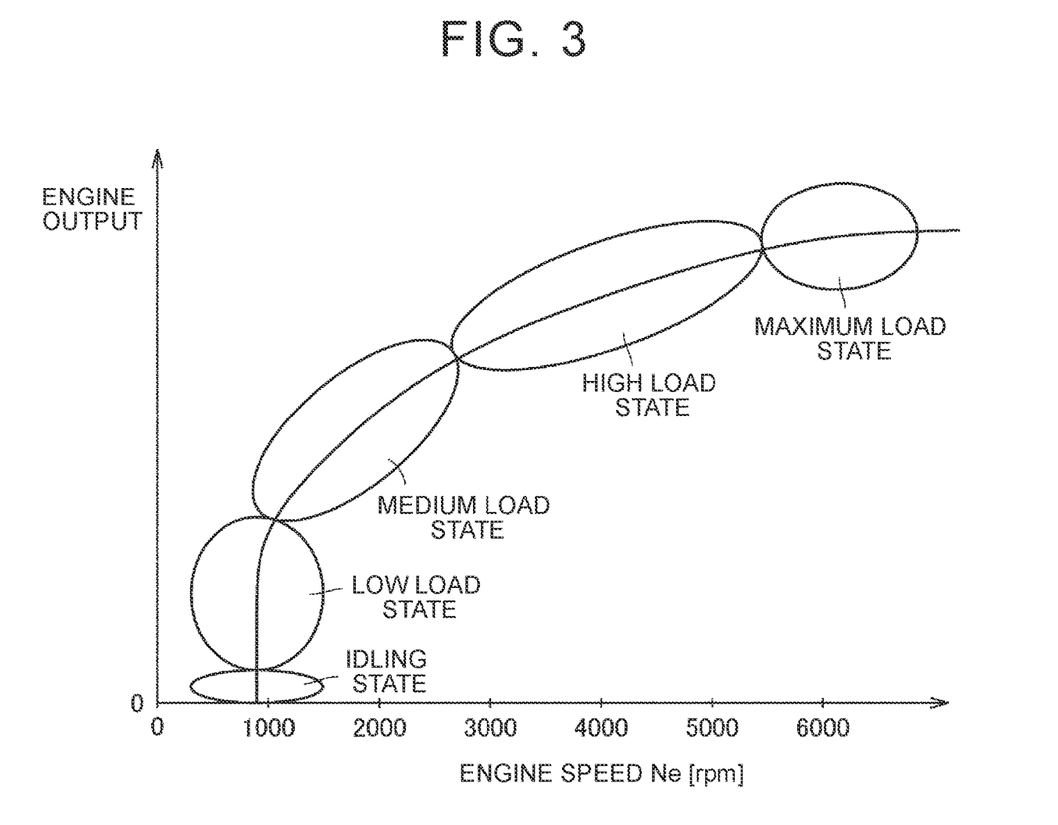
FIG. 3 is a diagram showing a performance curve of the engine.

FIG. 3 is a diagram showing a performance curve of the engine 50. In FIG. 3, the horizontal axis represents an engine speed. The vertical axis shows the output of the engine 50. As shown in FIG. 3, the operating states of the engine 50 can be classified into, for example, five states in accordance with the engine speed Ne and the output of the engine 50.

In an idling state, the engine 50 performs self-sustaining operations. The engine speed Ne in the idling state is, for example, about 1000 rpm (rotation per minute). The engine speed Ne in a low load state is, for example, 1000 rpm, which is about the same as the engine speed in the idling state. The output of the engine 50 in the low load state is larger than the output in the idling state. The engine speed Ne in a medium load state is, for example, 1000 to 3000 rpm. The medium load state is used, for example, during steady traveling of the vehicle 1. The engine speed Ne in a high load state is, for example, 3000 to 5000 rpm. The high load state is used, for example, when accelerating the vehicle 1. The engine speed Ne in a maximum load state is, for example, 5000 rpm or higher. The maximum load state is used, for example, when the vehicle 1 is climbing a slope or running at high speed. However, the above classification is only an example, and the classification method is not limited to the above.

ECU Functions

Figure 4:
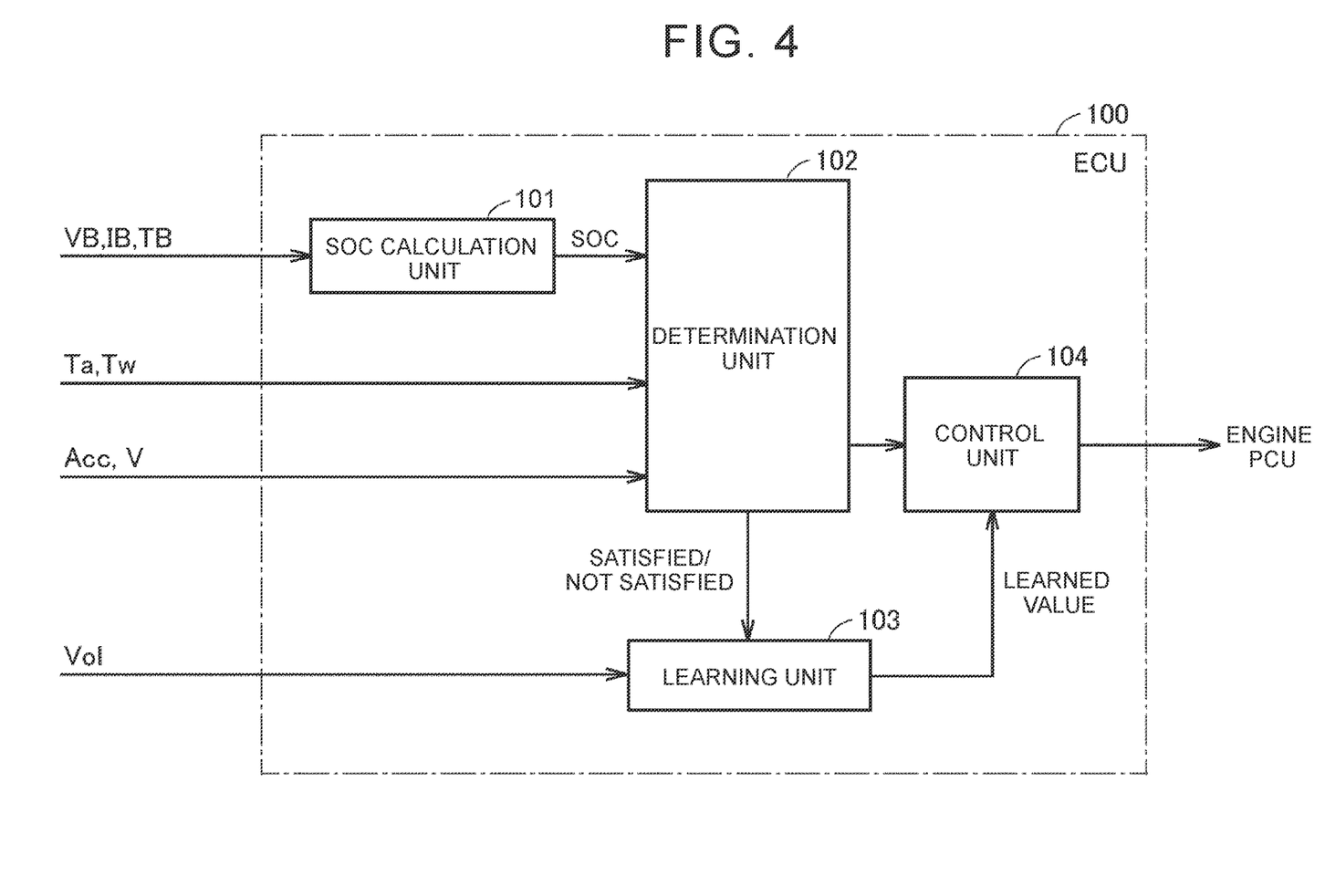
FIG. 4 is a functional block diagram for explaining a functional configuration of an ECU.

Control parameters (control amounts) such as the intake air amount, the air-fuel ratio, and the ignition timing are stored in the memory 100B of the ECU 100 in advance. The ECU 100 learns control parameters for each operating state of the engine 50, and uses the learned parameters for operating the engine 50.

FIG. 4 is a functional block diagram for explaining a functional configuration of the ECU 100. With reference to FIG. 4, the ECU 100 includes an SOC calculation unit 101, a determination unit 102, a learning unit 103, and a control unit 104.

The SOC calculation unit 101 calculates a state of charge (SOC) of the battery 10 based on the signals (VB, IB, TB) from the sensors in the battery sensor group 20. As the SOC calculation method, various known methods, such as a method using an SOC-OCV (open circuit voltage) curve and a method of integrating the current IB, can be adopted. The SOC calculated by the SOC calculation unit 101 is output to the determination unit 102.

The determination unit 102 receives the SOC from the SOC calculation unit 101. Further, the determination unit 102 receives the intake air temperature Ta from the intake air temperature sensor 62 and the coolant temperature Tw from the water temperature sensor 63. Further, the determination unit 102 receives the accelerator operation amount Acc from the accelerator pedal position sensor 91 and the vehicle speed V from the vehicle speed sensor 92. The determination unit 102 then determines whether learning conditions for the learning unit 103 to learn the control parameters (more specifically, the intake air amount) are satisfied based on the signals above. The learning conditions include a condition as to whether the vehicle 1 is running stably enough to learn the intake air amount. Examples of the learning conditions will be described later.

The learning unit 103 receives the intake air amount from the air flow meter 65, and learns the intake air amount when the learning conditions are satisfied (the ISC learning). More specifically, an intake passage of the engine 50 includes an exhaust gas recirculation device (not shown) for recirculating a part of the exhaust gas (hereinafter also referred to as exhaust gas recirculation (EGR) gas). The EGR gas is cooled by an EGR cooler and mixed with the intake air at room temperature. In the processing above, water vapor in the EGR gas is condensed to generate water. The condensed water contains unburned fuel components (e.g. soot and hydrocarbons). Therefore, the unburned fuel components adhere to the intake passage and gradually accumulate. A deposit attached to the intake passage as described above can deteriorate an intake efficiency of the air. Therefore, it is desirable to learn the appropriate intake amount of the engine 50 (desirable to execute the ISC learning). However, it is necessary to learn the intake air amount that does not depend on the throttle opening. Accordingly, when the ISC learning is executed, the engine 50 is operated in an idling state.

The learning unit 103 may learn other control parameters (e.g. air-fuel ratio and ignition timing). The control parameters (learning values) learned by the learning unit 103 are output to the control unit 104 and reflected in the control of the engine 50 by the control unit 104.

The control unit 104 controls the operating states of the engine 50, the first motor generator 41, and the second motor generator 42 in accordance with a command from the determination unit 102.

Simultaneous Achievement of Battery Protection and ISC Learning

As described above, the engine 50 needs to be in the idling state when the ISC learning is executed. Therefore, the opportunities to execute the ISC learning are limited. It is desirable to increase the opportunities to learn the intake air amount so as to optimize the intake air amount. On the other hand, protection of the battery 10 is required while avoiding over-charging and over-discharging of the battery 10. That is, it is desirable to achieve both increased opportunities to learn the intake air amount and protection of the battery 10. Therefore, in the first embodiment, whether the ISC learning can be executed and the modes for executing the ISC learning are switched in accordance with the SOC of the battery 10.

Figure 5:
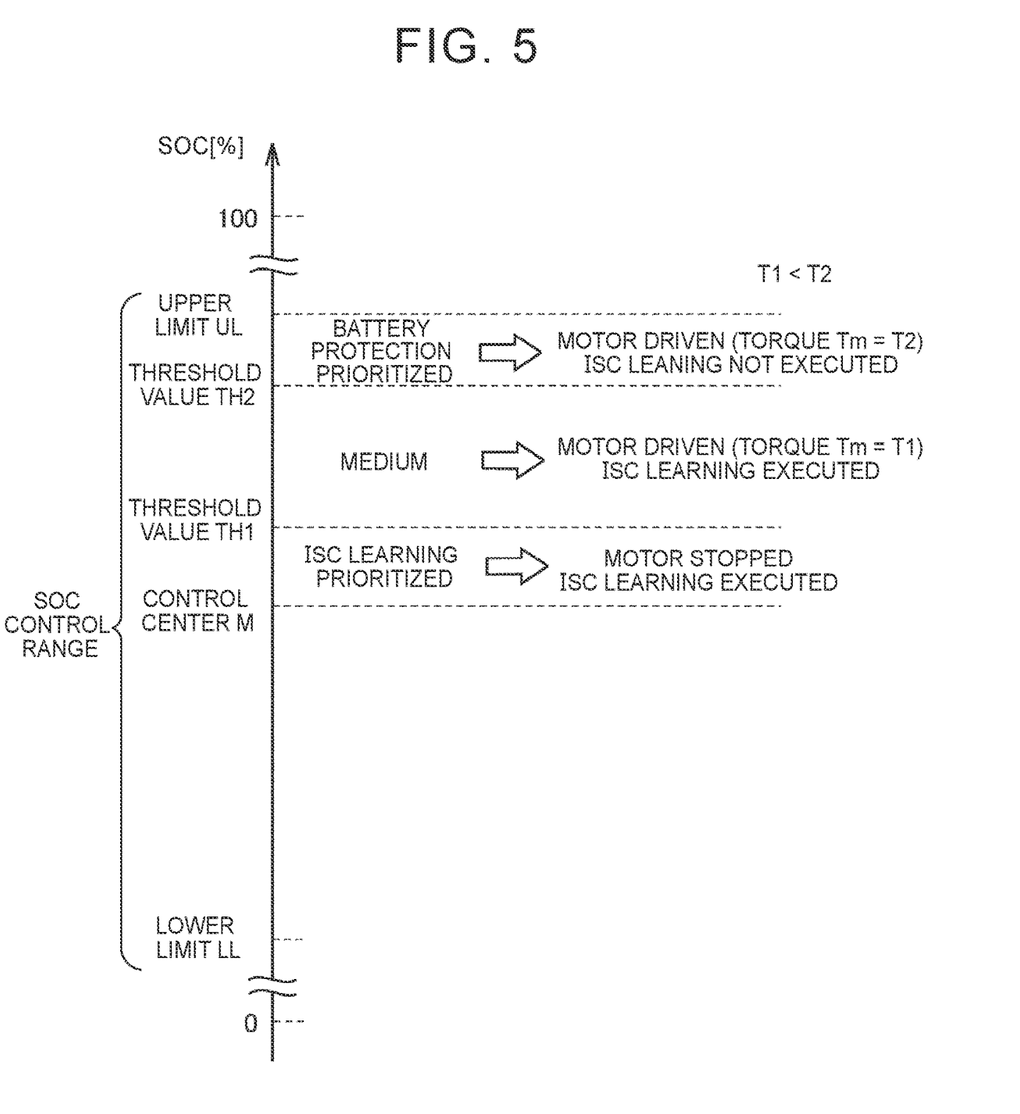
FIG. 5 is a diagram for explaining a relationship between a SOC of a battery 10 and ISC learning according to the first embodiment.

FIG. 5 is a diagram for explaining a relationship between the SOC of the battery 10 and the ISC learning according to the first embodiment. With reference to FIG. 5, the SOC of the battery 10 has a predetermined control range (SOC control range) for maintaining the SOC by appropriately switching between charging and discharging of the battery 10. An upper limit UL of the SOC control range is, for example, UL=80%. A lower limit LL of the SOC control range is, for example, LL=40%. A SOC control center M is a value (typically an intermediate value) between the upper limit UL and the lower limit LL, and for example, M=60%.

In the first embodiment, two threshold values (TH1, TH2) are set within the control range of the SOC of the battery 10. A first threshold value TH1 is an SOC higher than the SOC control center M. A second threshold value TH2 is an SOC that is further higher than the first threshold value TH1. As an example, the first threshold value TH1=65% and the second threshold value TH2=75%.

Hereinafter, it is assumed that an ISC learning execution request (ISC learning request) is issued while the vehicle 1 is in motor running (typically creeping) with the engine 50 stopped. The ECU 100 determines whether to execute the ISC learning in accordance with the SOC of the battery 10.

First, a case where the SOC of the battery 10 is equal to or lower than the first threshold value TH1 (for example, when SOC≤65%) will be described. In this case, execution of the ISC learning is prioritized. That is, the ECU 100 stops motor running of the vehicle 1 and starts the engine 50 such that the idling state is established. With the operation above, the ISC learning can be executed as usual.

Next, a case where the SOC of the battery 10 is higher than the second threshold value TH2 (for example, when SOC>75%) will be described. In this case, protection of the battery 10 is prioritized over execution of the ISC learning, and the ISC learning is not executed.

More specifically, even when the engine 50 is in the idling state, there may be a situation where output torque (engine torque) Te from the engine 50 is larger than torque required by the vehicle 1 (vehicle required torque) during the operation of the engine 50. On the basis of the above, there may be a case where a surplus of the engine torque Te with respect to the vehicle required torque is used for power generation operation of the first motor generator 41 and/or the second motor generator 42 and the battery 10 is charged. When the SOC of the battery 10 is higher than the second threshold value TH2, there is almost no margin until the SOC reaches the upper limit UL (for example, 80%) at that time. Therefore, when the battery 10 is further charged, the SOC may exceed the upper limit UL. Therefore, the ECU 100 does not execute the ISC learning such that the battery 10 does not enter an over-charged state. That is, the ECU 100 does not start the engine 50. The ECU 100 then continues motor running of the vehicle 1 without stopping, thereby continuing to discharge the battery 10.

Subsequently, a case where the SOC of the battery 10 is higher than the first threshold value TH1 and equal to or lower than the second threshold value TH2 (for example, when 65%<SOC≤75%) will be described. In this case, there is a margin until the SOC reaches the upper limit UL as compared with the case where the SOC of the battery 10 is higher than the second threshold value TH2. Therefore, the ISC learning is executed while protecting the battery 10 to a certain extent.

Specifically, torque (motor torque) Tm output from the second motor generator 42 is made constant. A constant value of the motor torque Tm may be determined in advance such that the constant value becomes a value sufficiently smaller (described as T1) than a value required to simultaneously realize both motor running of the vehicle 1 and the ISC learning. The motor torque Tm=T1 is a positive value although the motor torque Tm=T1 is smaller than the motor torque Tm=T2 when the SOC of the battery 10 is higher than the second threshold value TH2. Therefore, the battery 10 continues discharging. Therefore, reaching the over-charged state of the battery 10 can be suppressed.

As described above, in the first embodiment, when the SOC of the battery 10 is higher than the second threshold value TH2, the ISC learning is not executed and protection of the battery 10 is prioritized. In this case, the engine 50 remains stopped. Therefore, the battery 10 is not charged by the surplus engine torque Te. As a result, over-charging of the battery 10 can be prevented. On the other hand, even when the SOC of the battery 10 is higher than the first threshold value TH1 and equal to or lower than the second threshold value TH2, achievement of both protection of the battery 10 and securing of opportunities to execute the ISC learning is aimed. Specifically, the ISC learning is executed while driving the second motor generator 42 with the motor torque Tm=T1 (<T2) that is a low torque (positive torque). Over-charging of the battery 10 can be prevented by discharging the battery 10 while the ISC learning is executed.

Learning Control Flow

Figure 6:
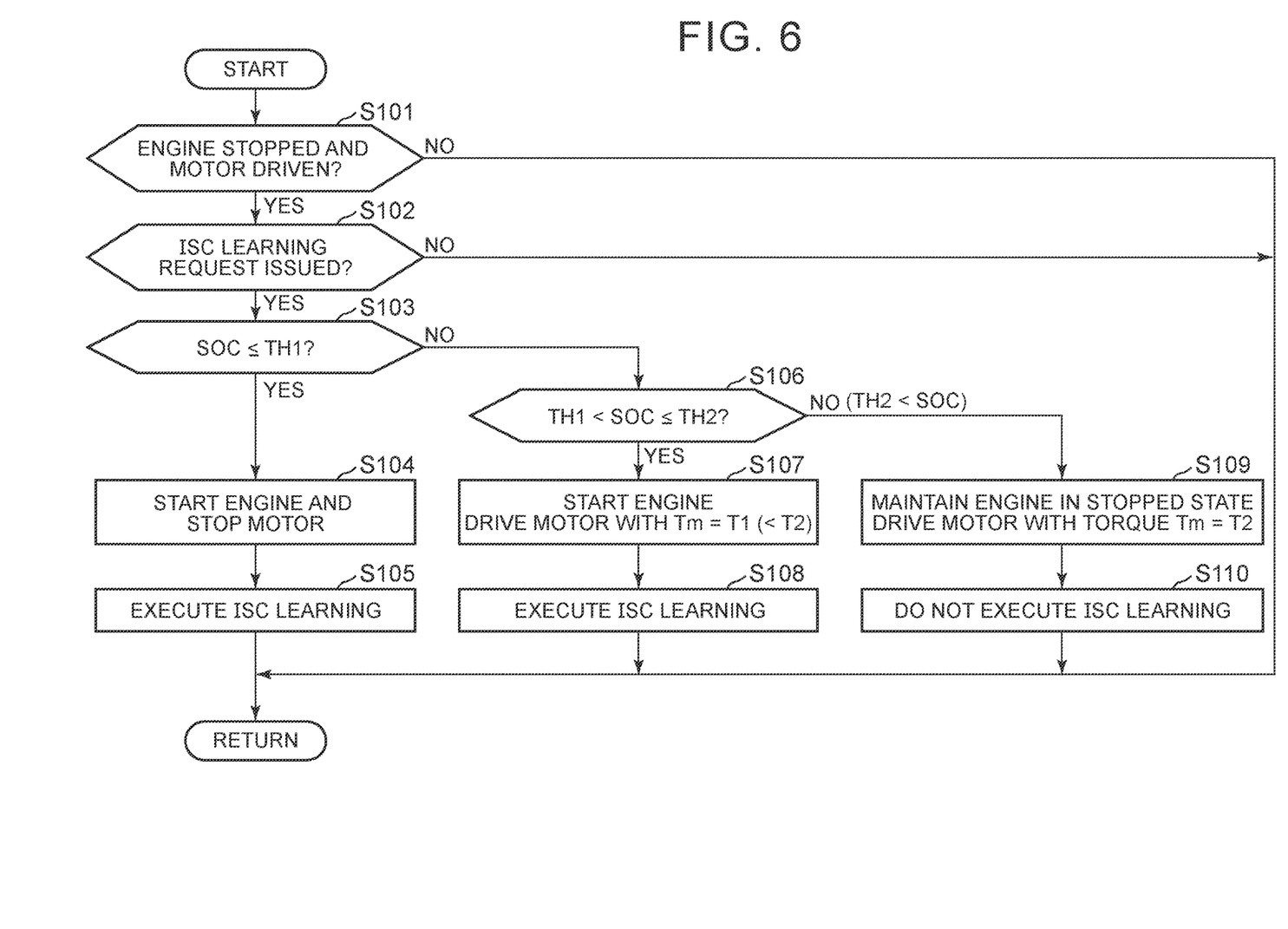
FIG. 6 is a flowchart showing a series of controls related to the ISC learning according to the first embodiment.

FIG. 6 is a flowchart showing a series of controls related to the ISC learning according to the first embodiment. The flowchart (as well as the flowchart shown in FIG. 8 that will be described later) is repeatedly executed by being called from a main routine (not shown) at predetermined calculation cycles. Each step is realized by software processing executed by the ECU 100. However, each step may be realized by hardware (electric circuit) that is fabricated to be included in the ECU 100. Hereinafter, the term "step" is abbreviated as S.

With reference to FIG. 6, the ECU 100 determines in S101 whether the vehicle 1 is in motor running. For example, when the ECU 100 does not output a command for driving the engine 50 to the engine 50, the ECU 100 can determine that the engine 50 is in a stopped state. Further, when a command for driving the second motor generator 42 is being output from the ECU 100 to the PCU 30, the ECU 100 can determine that the second motor generator 42 is being driven. Alternatively, the ECU 100 may determine that the engine 50 is in the stopped state when the engine speed Ne is less than a predetermined speed. The ECU 100 may determine that the second motor generator 42 is being driven when the rotation speed of the second motor generator 42 (a detected value of a sensor that is not shown) is equal to or higher than the predetermined speed. When the vehicle 1 is not in motor running (NO in S101), the processing returns to the main routine. When the vehicle 1 is in motor running (YES in S101), the ECU 100 advances the processing to S102.

In S102, the ECU 100 determines whether the ISC learning request is issued. In the following cases, the conditions under which the ISC learning can be executed are satisfied, and the ISC learning request is issued. First, as described above, the intake air amount during the ISC learning needs to be an amount that does not depend on the throttle opening. Therefore, for example, when the engine 50 is operated in the idling state, the throttle opening has the minimum value (for example, 0), and the vehicle speed V is lower than the predetermined speed, the ISC learning request is issued.

Further, it is preferable to learn a minimum amount required for the engine 50 that is operating in the idling state as the intake air amount of the engine 50. The intake air amount is reduced as the engine 50 is warmed up. Therefore, in addition to the above, the ISC learning request may be issued when the engine 50 is warmed up. The coolant temperature Tw from the water temperature sensor 63 can be used to determine whether the engine 50 has been warmed up. When the coolant temperature Tw is equal to or higher than a predetermined value (for example, 70° C.), warming up of the engine 50 is determined to be completed.

The processing returns to the main routine also when the ISC learning request has not been issued (NO in S102). When the ISC learning request is issued (YES in S102), the ECU 100 compares the SOC of the battery 10 with the first threshold value TH1 (S103).

When the SOC of the battery 10 is equal to or lower than the first threshold value TH1 (for example, TH1=65%) (YES in S103), the ECU 100 advances the processing to S104. In S104, the ECU 100 stops the second motor generator 42 while starting the stopped engine 50. The ECU 100 then executes the ISC learning (S105).

When the SOC of the battery 10 is higher than the first threshold value TH1 (NO in S103), the ECU 100 determines whether the SOC of the battery 10 is equal to or lower than the second threshold value TH2 (S106).

When the SOC of the battery 10 is equal to or lower than the first threshold value TH1 and equal to or lower than the second threshold value TH2 (YES in S106), the ECU 100 advances the processing to S107. In S107, the ECU 100 starts the stopped engine 50. Further, the ECU 100 also maintains the second motor generator 42 in a driven state. The ECU 100 then executes the ISC learning (S108).

In the ISC learning in S107 and S108, it is desirable to correct the engine torque Te used for the ISC learning in accordance with the motor torque Tm. More specifically, the required driving force P is realized by the sum of engine direct torque Tep and the motor torque Tm (see Equation (1) below). The ECU 100 reduces the engine direct torque Tep by the amount of the motor torque Tm.

$$Tep+Tm=P* \qquad (1)$$

The engine direct torque Tep is a forward torque transmitted from the engine 50 to the ring gear (that is, the drive shaft 72) of the power split device 71 with output torque Tg from the first motor generator 41 as a reaction force. The relationship between the engine direct torque Tep and the torque Tg is uniquely determined in accordance with a gear ratio ρ of the power split device 71 (see Equation (2) below). Therefore, the engine direct torque Tep can be calculated from the torque Tg.

$$Tep=-1/\rho \times Tg \qquad (2)$$

When the SOC of the battery 10 is higher than the second threshold value TH2 (NO in S106), the ECU 100 advances the process to S109. In S109, the ECU 100 maintains the engine 50 in the stopped state. Further, the ECU 100 also maintains the second motor generator 42 in a driven state. The output torque (motor torque) Tm from the second motor generator at this time is T1, which is larger than the motor torque Tm=T2 in S107 and S108. The ECU 100 does not execute the ISC learning (S110).

As described above, in the first embodiment, when the SOC of the battery 10 is equal to or lower than the first threshold value TH1, the ISC learning is executed as usual to secure the opportunity to execute the ISC learning (S104, S105). On the other hand, when the SOC of the battery 10 is higher than the second threshold value TH2, the ISC learning is not executed to avoid over-charging of the battery 10 (S109, S110). With the processing above, it is possible to achieve both protection of the battery 10 and securing of the opportunity to execute the ISC learning.

Further, when the SOC of the battery 10 is between the first threshold value TH1 and the second threshold value TH2, the ISC learning is executed while driving the second motor generator 42 with a positive low torque (motor torque Tm=T1) (S107, S108). This also secures the opportunity to execute the ISC learning while protecting the battery 10.

Second Embodiment

In the first embodiment, an example of protecting the battery 10 from over-charging has been described. In a second embodiment, an example of protecting the battery 10 from over-discharging will be described. The configuration of the vehicle according to the second embodiment is the same as the configuration of the vehicle 1 according to the first embodiment. Therefore, the description will not be repeated.

Figure 7:
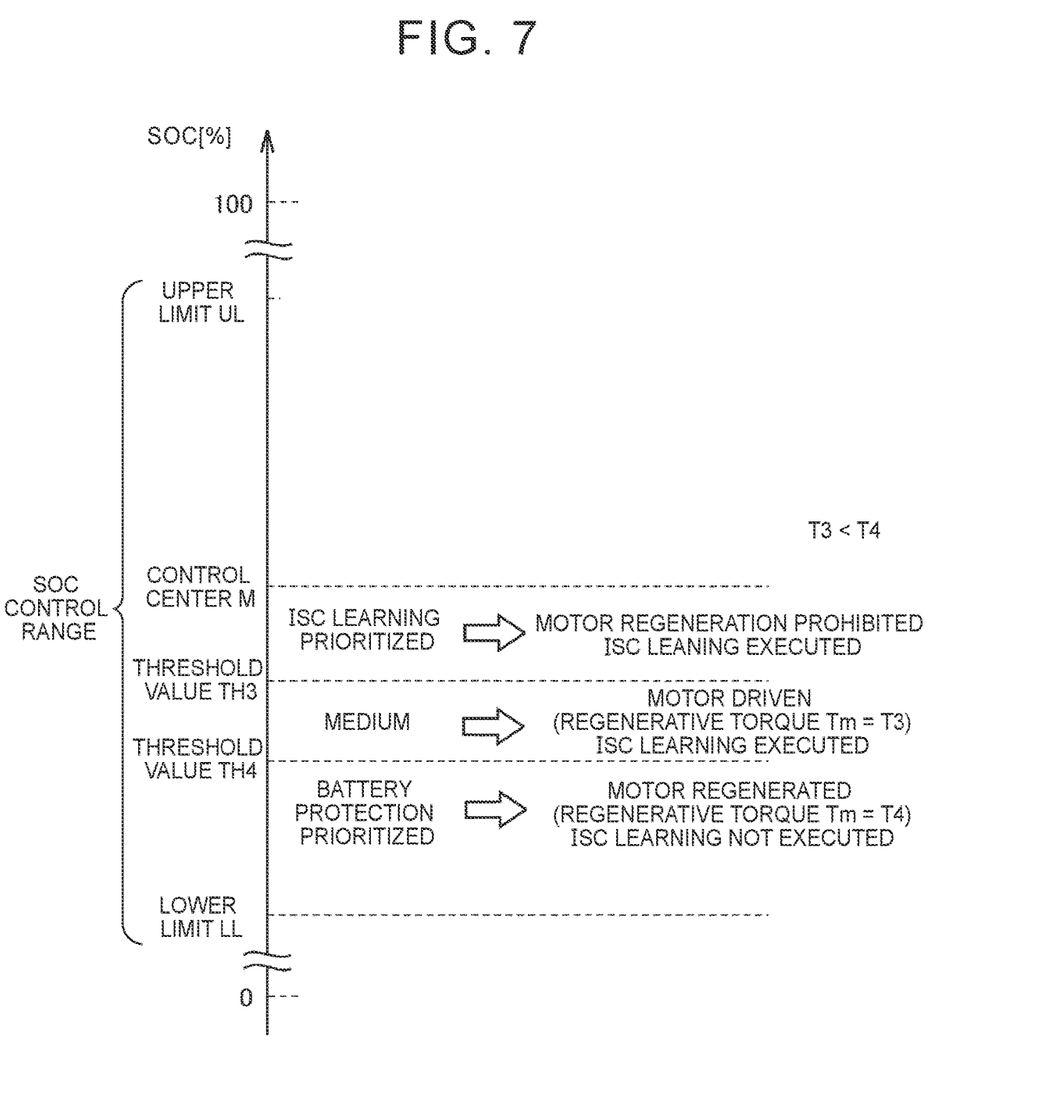
FIG. 7 is a diagram for explaining a relationship between the SOC of the battery 10 and the ISC learning according to the second embodiment.

FIG. 7 is a diagram for explaining a relationship between the SOC of the battery 10 and the ISC learning according to the second embodiment. With reference to FIG. 7, also in the second embodiment, two threshold values (TH3, TH4) are set within the control range of the SOC of the battery 10. A third threshold value TH3 is an SOC lower than the SOC control center M. A fourth threshold value TH4 is an SOC that is further lower than the third threshold value TH3. As an example, the third threshold value TH3=50% and the fourth threshold value TH4=40%.

Hereinafter, it is assumed that the ISC learning execution request (the ISC learning request) is issued while the vehicle 1 is in regenerative running with the engine 50 stopped. The ECU 100 determines whether to execute the ISC learning in accordance with the SOC of the battery 10.

When the SOC of the battery 10 is higher than the third threshold value TH3 (for example, when SOC>50%), execution of the ISC learning is prioritized. That is, the ECU 100 prohibits regenerative running of the vehicle 1 (power generation by the second motor generator 42 while the vehicle 1 is running), and starts the engine 50 to place the vehicle 1 in the idling state so as to execute the ISC leaning. With the operation above, the ISC learning can be executed as usual.

When the SOC of the battery 10 is equal to or lower than the fourth threshold value TH4 (for example, when SOC 40%), protection of the battery 10 is prioritized over execution of the ISC learning, and the ISC learning is not executed. That is, in order to avoid the battery 10 from reaching the over-discharged state, regenerative running of the vehicle 1 is continued and the battery 10 is continuously charged. Meanwhile, the ECU 100 does not execute the ISC learning and does not start the engine 50.

When the SOC of the battery 10 is higher than the fourth threshold value TH4 and is equal to or lower than the third threshold value TH3 (for example, when 40%<SOC≤50%), there is a margin until the SOC reaches the lower limit LL, compared to the case where the SOC of the battery 10 is equal to or lower than the fourth threshold value TH4. Therefore, the ISC learning is executed while protecting the battery 10 to a certain extent.

Specifically, regenerative torque (motor torque) Tm of the second motor generator 42 is made constant. A value T3 (absolute value) of the motor torque Tm at this time is smaller than the motor torque Tm=T4 (absolute value) during regenerative running when the SOC of the battery 10 is equal to or lower than the fourth threshold value TH4, but is a negative value. Therefore, the battery 10 is charged. Therefore, reaching the over-discharged state of the battery 10 can be suppressed.

Figure 8:
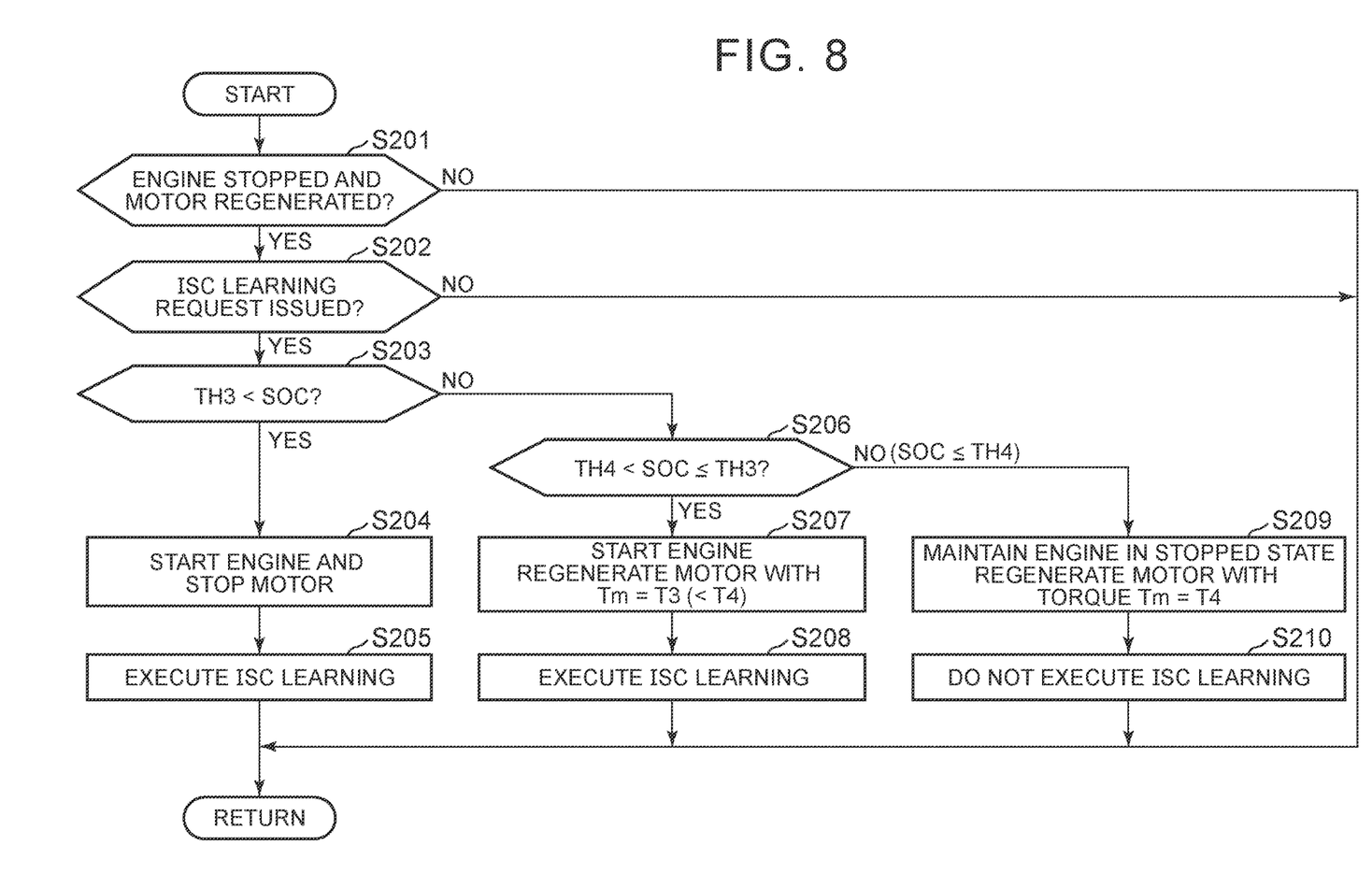
FIG. 8 is a flowchart showing a series of controls related to the ISC learning according to the second embodiment.

FIG. 8 is a flowchart showing a series of controls related to the ISC learning according to the second embodiment. With reference to FIG. 8, the ECU 100 determines in S201 whether the engine 50 is stopped and the vehicle 1 is in regenerative running. When the engine 50 is operating or the vehicle 1 is not in regenerative running (NO in S201), the processing returns to the main routine. When the engine 50 is stopped and the vehicle 1 is in regenerative running (YES in S201), the ECU 100 advances the processing to S202.

In S202, the ECU 100 determines whether the ISC learning request is issued. Because the processing is the same as the processing in S102 in the first embodiment (see FIG. 6), the detailed description will not be repeated. The processing returns to the main routine also when the ISC learning request has not been issued (NO in S202). When the ISC learning request is issued (YES in S202), the ECU 100 compares the SOC of the battery 10 with the third threshold value TH3 (S203).

When the SOC of the battery 10 is equal to or lower than the third threshold value TH3 (for example, TH3=50%) (YES in S203), the ECU 100 advances the processing to S204. In S204, the ECU 100 prohibits regenerative operations of the second motor generator 42 while starting the stopped engine 50. The ECU 100 then executes the ISC learning (S205).

When the SOC of the battery 10 is higher than the third threshold value TH3 (NO in S203), the ECU 100 determines whether the SOC of the battery 10 is equal to or higher than the fourth threshold value TH4 (S206).

When the SOC of the battery 10 is equal to or higher than the fourth threshold value TH4 and equal to or lower than the third threshold value TH3 (YES in S206), the ECU 100 advances the processing to S207. In S207, the ECU 100 starts the stopped engine 50. Further, the ECU 100 also maintains the regenerative operations of the second motor generator 42. The ECU 100 then executes the ISC learning (S208).

When the SOC of the battery 10 is lower than the fourth threshold value TH4 (NO in S206), the ECU 100 advances the process to S209. In S209, the ECU 100 maintains the engine 50 in the stopped state. Further, the ECU 100 also maintains the regenerative operations of the second motor generator 42. The regenerative torque (motor torque) Tm of the second motor generator at this time is T4, which is larger than the motor torque Tm=T3 in S207 and S208. The ECU 100 does not execute the ISC learning (S210).

As described above, in the second embodiment, when the SOC of the battery 10 is equal to or higher than the third threshold value TH3, the ISC learning is executed as usual to secure the opportunity to execute the ISC learning. On the other hand, when the SOC of the battery 10 is equal to or lower than the fourth threshold value TH4, the ISC learning is not executed in order to prioritize protection of the battery 10 to avoid over-discharging of the battery 10. With the processing above, it is possible to achieve both protection of the battery 10 and securing of the opportunity to execute the ISC learning.

Further, when the SOC of the battery 10 is between the third threshold value TH3 and the fourth threshold value TH4, the ISC learning is executed while performing the regenerative operations of the second motor generator 42 with a low torque (motor torque Tm=T3<T4). This also secures the opportunity to execute the ISC learning while protecting the battery 10.

The embodiments disclosed herein should be considered as illustrative and not restrictive in all respects. The scope of the present disclosure is shown by the claims, rather than the above embodiments, and is intended to include all modifications within the meaning and the scope equivalent to those of the claims.

What is claimed is:

1. A hybrid vehicle, comprising:
    an engine;
    a motor for running;
    a battery that supplies and receives electric power to and from the motor; and
    a control device configured to control the engine and the motor and to execute intake air amount learning to learn an intake air amount of the engine, wherein
    a first threshold value and a second threshold value that is higher than the first threshold value are defined for a state of charge of the battery, and
    while the hybrid vehicle is running using the motor with the engine in a stopped state, the control device
    maintains the motor in a driven state while maintaining the engine in the stopped state and does not execute the intake air amount learning when the state of charge of the battery exceeds the second threshold value, and
    starts the engine and drives the motor with constant torque to execute the intake air amount learning when the state of charge of the battery takes a value between the first threshold value and the second threshold value.

2. The hybrid vehicle according to claim 1, wherein the control device starts the engine and prohibits driving of the motor to execute the intake air amount learning when the state of charge of the battery falls below the first threshold value.

3. The hybrid vehicle according to claim 2, wherein the constant torque that is output from the motor when the state of charge of the battery takes a value between the first threshold value and the second threshold value is smaller than torque output from the motor when the state of charge of the battery exceeds the second threshold value.

4. The hybrid vehicle according to claim 1, wherein the first threshold value is higher than a state-of-charge control center of the battery.

5. A hybrid vehicle, comprising:
    an engine;
    a motor for running;
    a battery that supplies and receives electric power to and from the motor; and
    a control device configured to control the engine and the motor and to execute intake air amount learning to learn an intake air amount of the engine, wherein
    a third threshold value and a fourth threshold value that is lower than the third threshold value are defined for a state of charge of the battery, and
    while the motor is being regeneratively driven with the engine in a stopped state, the control device
    does not execute the intake air amount learning and maintains the motor in a regenerative state when the state of charge of the battery falls below the fourth threshold value, and
    starts the engine and regeneratively drives the motor with constant torque to execute the intake air amount learning when the state of charge of the battery takes a value between the third threshold value and the fourth threshold value.

6. The hybrid vehicle according to claim 5, wherein the control device starts the engine and prohibits regeneration of the motor to execute the intake air amount learning when the state of charge of the battery exceeds the third threshold value.

7. The hybrid vehicle according to claim 6, wherein the constant torque with which the motor is regeneratively driven when the state of charge of the battery takes a value between the third threshold value and the fourth threshold value is smaller than torque with which the motor is regeneratively driven when the state of charge of the battery falls below the fourth threshold value.

8. The hybrid vehicle according to claim 5, wherein the third threshold value is higher than a state-of-charge control center of the battery.

* * * * *